United States Patent [19]

Hosko

[11] 4,097,097
[45] Jun. 27, 1978

[54] BULK MAIL CONTAINER

[75] Inventor: Robert M. Hosko, Stroudsburg, Pa.

[73] Assignee: Banner Metals Division of Intercole automation, Inc., Compton, Calif.

[21] Appl. No.: 830,053

[22] Filed: Sep. 2, 1977

[51] Int. Cl.² .............. B62B 11/00; A47B 55/02; B62B 3/02
[52] U.S. Cl. ................................. 312/250; 105/376; 119/17; 211/150; 280/33.99 H
[58] Field of Search ............ 312/250; 206/505, 513; 108/1; 211/150; 160/327; 280/33.99 H, 33.99 R, 33.99 F, 79.1, 79.3, 47.34, 47.35; 119/117; 105/376, 467

[56] References Cited

U.S. PATENT DOCUMENTS

| | | | |
|---|---|---|---|
| 2,546,929 | 3/1951 | Nampa | 105/467 |
| 2,565,997 | 8/1951 | Stone | 105/376 |
| 3,840,242 | 10/1974 | Craig et al. | 280/33.99 H |
| 3,861,704 | 1/1975 | De Witte | 280/79.3 |
| 3,861,768 | 1/1975 | Wilson | 280/33.99 H |
| 3,953,044 | 4/1976 | Wilson | 280/33.99 H |

Primary Examiner—Casmir A. Nunberg
Assistant Examiner—Alex Grosz
Attorney, Agent, or Firm—Keith D. Beecher

[57] ABSTRACT

A container is provided for bulk mail, and the like, which has the form of a wheeled rack. The container is constructed to have a lower shelf and an intermediate shelf, both of which are hinged to a supporting frame, and each of which may be turned from a horizontal load supporting position to an upright position when the container is not in use to enable the container to be nested into other like containers so as to conserve space. The container also includes an intermediate frame which surrounds the intermediate shelf and which supports the intermediate shelf in its horizontal position, and which also is hinged to the supporting frame and may be turned with the intermediate shelf to an upright position. Also, the intermediate shelf may be turned up when the container is in use to provide sufficient space within the container for large or bulky packages or mail sacks, the same extending through and being restrained by the intermediate frame which remains in its horizontal position. The container also has a flexible webbing member which is removably attached to the front of the container by a restraining bar which has ends that hook over side struts of the container. When the restraining bar is in place, the webbing member may be extended upwardly and downwardly from the restraining bar across the open front of the container to enclose the upper and lower portions of the open front so as to retain the load within the container.

2 Claims, 3 Drawing Figures

BULK MAIL CONTAINER

The container of the present invention is similar in some respects to the container disclosed in patent application Ser. No. 749,732, now U.S. Pat. No. 4,065,141 which was filed Dec. 13, 1976 in the name of Janes D. Wilson, and which is assigned to the present Assignee.

BACKGROUND OF THE INVENTION

The bulk mail container of the present invention, like the container of the aforesaid patent application, is particularly suited for carrying trays, packages, or sacks of bulk mail between a main post office and sub-station post offices. The container, like the container of the aforesaid application, is equipped with a bottom shelf and an intermediate shelf for this purpose, both of which may be turned to an upright position, as mentioned above, to permit mutual nesting of the unused containers to conserve space; and in which the intermediate shelf may be turned to an upright position to provide space for large and bulky packages and mail sacks within the container.

The container of the aforesaid application has a web-like member which forms upper and lower front gates for the container, and which is attached to the forward edge of a hinged frame which supports the intermediate shelf. The web-like member of said application is extended upwardly and downwardly from the forward edge of the frame to enclose the open front of the container when the frame is turned down to a horizontal position, and the upper and lower ends of the web-like member may be locked to the container as a security measure for the contents of the container.

In the container of the present invention, the web-like member is supported on a restraining bar which is removably supported across the front of the container. This construction permits the web-like member to be entirely removed from the front of the container when unimpeded access to the interior of the container is desired.

DETAILED DESCRIPTION OF THE ILLUSTRATED EMBODIMENT

Figure 1:
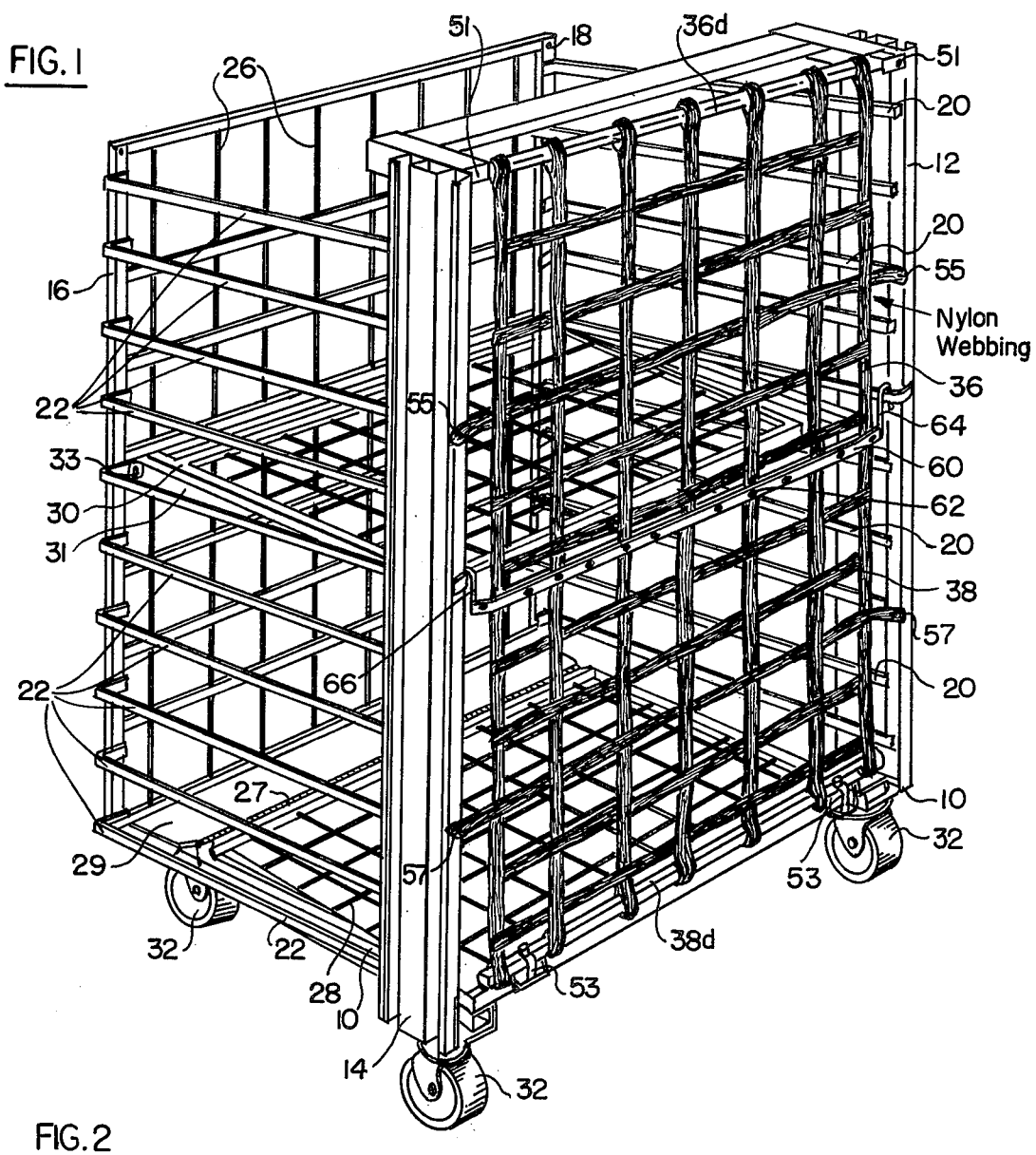
FIG. 1 is a perspective representation of a container constructed in accordance with one embodiment of the invention.

The bulk mail container illustrated in FIG. 1 includes a U-shaped lower frame member 10 which defines an open front for the container, and which has side members which converge outwardly from the rear side of the container. Four upright posts are mounted on the U-shaped frame at the respective corners of the container, these posts being designated 12, 14, 16 and 18 respectively.

A plurality of essentially horizontal struts 20 are welded, or otherwise attached, to the posts 12 and 18, and the struts 20 extend between the posts in spaced and parallel relationship to one another. Likewise, a plurality of generally horizontal struts 22 are welded, or otherwise attached, to the posts 14 and 16, and extend between the posts in spaced and parallel relationship with one another. The struts 20 form one of the side walls of the container, whereas the struts 22 form the second side wall. The side walls diverge outwardly from the rear side to the front side of the container. The container is also equipped with a wire-formed rear wall 26, as shown.

The resulting container has an open front which is somewhat wider than the rear wall. However, the container itself has a rectangular shape. The container also has a lower shelf 28 which has a generally rectangular configuration, and which is hinged along its rear edge to a bottom section 29 by means of a hinge 27. The lower shelf 28 may be turned down to a horizontal load-receiving position, such as shown in FIG. 1, or it may be turned up to an essentially upright position.

The container also has an intermediate shelf 30 which has a generally rectangular configuration, and which is pivotally mounted to a frame 31. The widths of the shelf 28 and the frame 31 correspond to the width of the rear wall 26 of the container, and the shelves are somewhat narrower than the open front. The frame 31 surrounds the intermediate shelf 30 and it, in turn, is pivotally mounted to the posts 16 and 18, by means of a pin 33. The frame 31 supports shelf 30 when the shelf is turned down to a horizontal load-supporting position, such as shown in FIG. 1. The shelf 30 may be turned to an upright position, while the frame 31 remains in the horizontal position, to provide more interior space within the container for large and bulky packages and sacks, with the frame serving as a retaining means therefor. However, when the frame 31 is turned to its upright position about the pivot pin 33, it carries the shelf 30 with it, so that both the shelf and frame assume the upright position.

When the container is empty, frame 31 and shelf 30 may be turned to their upright positions, and lower shelf 28 may also be turned to its upright position, so that a plurality of containers similar to the container of FIG. 1 may be nested into one another through their respective open fronts. The containers nest by receiving the rear wall of one container through the open front of another container with the side struts 20, 22 of the first container sliding under the corresponding side struts of the second container.

The container has a plurality of casters 32 suspended from the lower frame 10 at the respective corners thereof. The casters 32 may be the usual type of swivel casters. A locking means may be provided for one of the casters 32 when the lower shelf 28 is turned down to its load-receiving position, so as to prevent the caster from turning, thereby facilitating the towing of the container in a train of like containers. This locking means may be of the type described and claimed, for example, in U.S. Pat. No. 3,861,702 which issued Jan. 21, 1975 to James D. Wilson.

Figure 2:
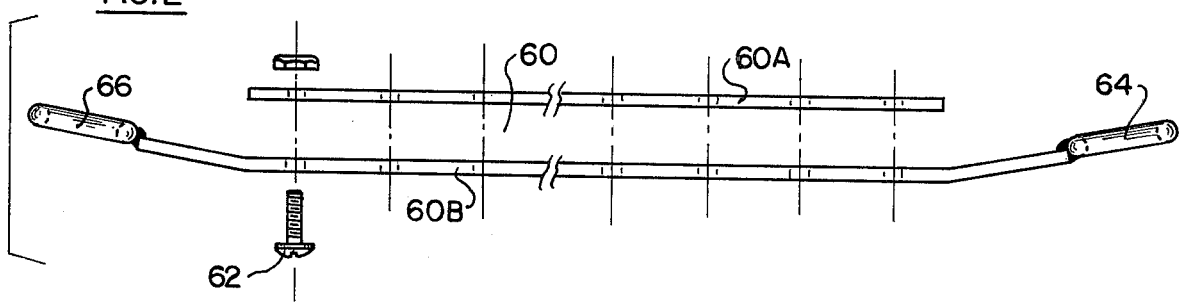
FIG. 2 is a top plan view of a restraining bar which is adapted removably to support the aforesaid web-like member across the front of the container.
Figure 3:
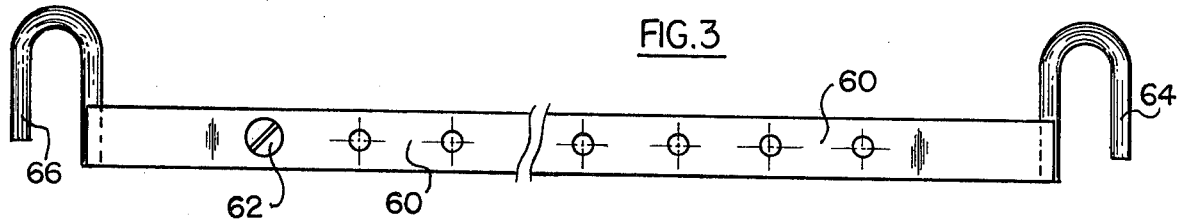
FIG. 3 is a side elevation of the restraining bar of FIG. 2.

A flexible web-like member formed, for example, of nylon webbing, provides an upper gate 36 and a lower gate 38 for the front of the container. The web-like member is attached along its mid-section to a restraining bar 60 by screws and bolts or by rivets 62. As shown in FIGS. 2 and 3, the restraining bar 60 is formed of two parts 60A, 60B which are held together by screws and bolts or rivets 62 and which sandwich the web-like member therebetween. When the hook-shaped ends, 64, 66 of restraining bar 60 are hooked over side struts 20, 22, as shown in FIG. 1, the gates 36 and 38 may be extended upwardly and downwardly to enclose the front of the container. The entire gate assembly may be removed from the front of the container merely by unhooking the ends 64, 66 of the restraining bar from the struts.

The upper end of upper gate 36 is fastened to a cross bar 36d which extends across the front of the container and is received in a pair of U-shaped supports 51 at the top of the posts 12 and 14. The lower end of lower gate 38 is fastened to a cross bar 38d which extends across the front of the container, and which is received in a pair of clips 53 at the front of shelf 28. An intermediate web of the gate 36 may be clipped to the posts 12 and 14 by appropriate clips 55, and an intermediate web of the gate 38 may be clipped to the posts by appropriate clips 57.

Appropriate security locks may be provided to retain cross bars 36d and 38d in their corresponding supports 51 and clips 53. When the container is not in use, the cross bars 36d and 38d may be released from their corresponding supports 51 and clips 53, and the entire gate assembly may be removed from the container. The shelf 30 and frame 31 may then be turned up to the upright position, together with the lower shelf 28. Then, the container is in condition to receive other like containers in a nested relationship.

The invention provides, therefore, an improved bulk mail container which is simple and rugged in its construction, and which is particularly suited for holding and transporting mail packages and sacks. The container has an advantage in that its forward gates may readily be adjusted to enclose fully the front end of the rack, and locked in place for security reasons, if so desired. The intermediate shelf may be turned up to its upright position to permit the container to handle bulky packages. Moreover, when the container is empty, the gates and shelves of the container may be turned to their upright positions, as described above, so as to condition the container to receive other similar containers in a nested condition with respect thereto so as to conserve space.

While a particular embodiment of the invention has been shown and described, modifications may be made. It is intended in the claims to cover the modifications which come within the spirit and scope of the invention.

What is claimed is:

1. A container for bulk mail, and the like, comprising: a lower horizontal frame having a rear member, an open front, and side members which diverge outwardly from the rear member; a plurality of spaced and parallel upright posts mounted on the horizontal frame at the front and rear thereof; an intermediate shelf of generally rectangular configuration having a rear end and a forward end; means pivotally mounting the rear end of the intermediate shelf to the posts at the rear of said horizontal frame to permit the intermediate shelf to be upwardly turnable from a generally horizontal load-supporting position to an upright position; a lower shelf of generally rectangular configuration having a rear end and a forward end; means pivotally mounting the rear end of the lower shelf to said horizontal frame to permit the lower shelf to be upwardly turnable from a generally horizontal load-supporting position to an upright position; support means on each side of the container for releasably supporting said first restraining bar a first restraining bar removably attached to the front of the container and extending thereacross at an intermediate position thereon; flexible webbing having its midsection attached to said first restraining bar and extending upwardly and downwardly therefrom to enclose the front of said container; two further restraining bars respectively attached to said webbing at the upper and lower ends thereof; and support means mounted at the upper and lower ends of the container for releasably supporting said further restraining bars all said restraining bars and flexible webbing forming separately openable upper and lower gates.

2. The container defined in claim 1, in which said first restraining bar has hook-shaped ends, and which includes a plurality of spaced and parallel struts extending between said posts at each side of said container, with one of said struts at each side of said container forming said first named support means for receiving the hook-shaped ends of said first restraining bar.

* * * * *